Nov. 18, 1952     E. J. FISHER     2,618,683
ELECTRIC SERVICE RACK, PARTICULARLY FOR LOW BUILDINGS
Filed Jan. 24, 1949
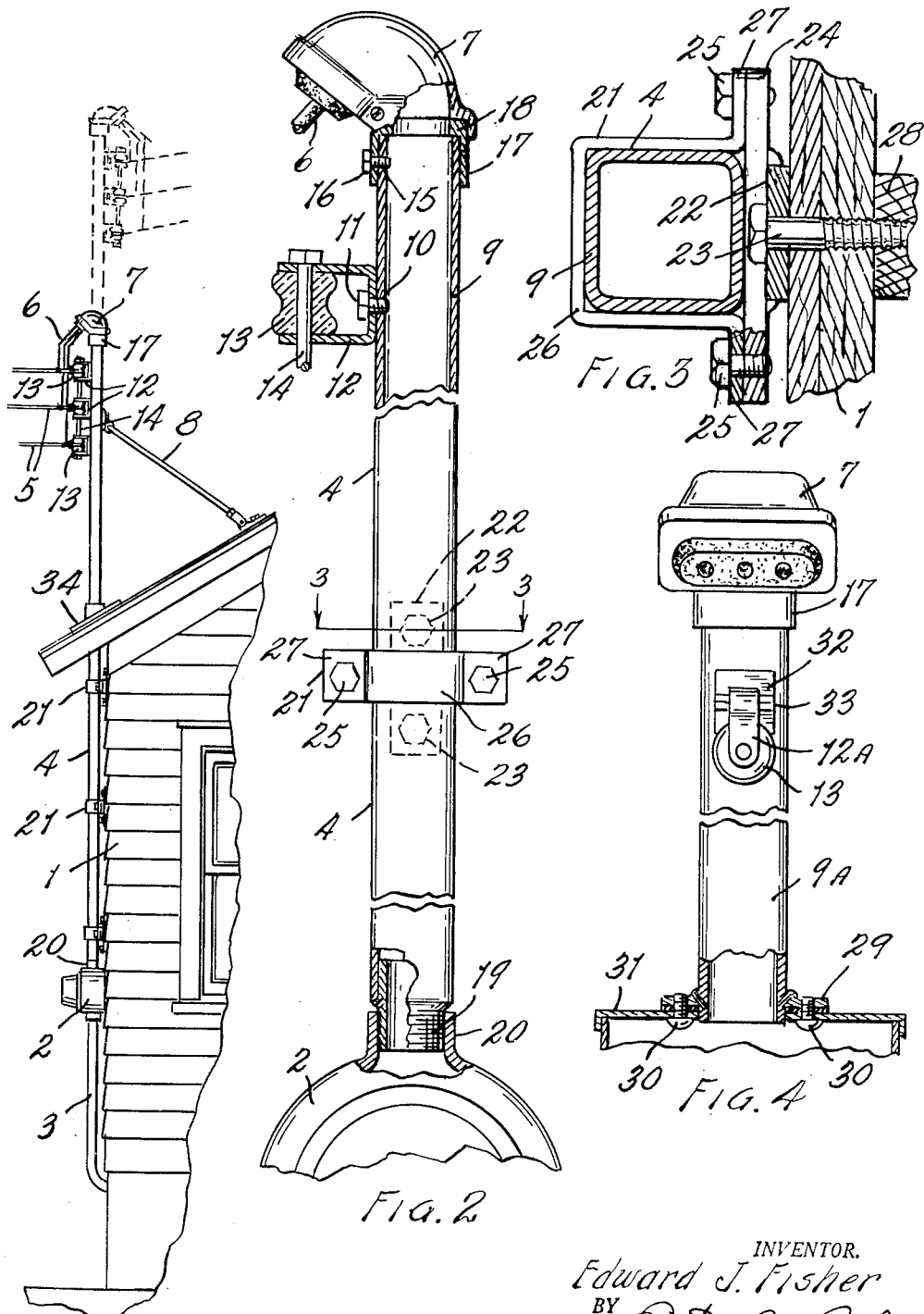
INVENTOR.
Edward J. Fisher
BY
Otto A. Earl
Attorney.

Patented Nov. 18, 1952

2,618,683

UNITED STATES PATENT OFFICE 2,618,683

ELECTRIC SERVICE RACK, PARTICULARLY FOR LOW BUILDINGS

Edward J. Fisher, Battle Creek, Mich.

Application January 24, 1949, Serial No. 72,417

2 Claims. (Cl. 174—81)

1

This invention relates to improvements in electric service racks particularly for low buildings.

The principal objects of this invention are:

First, to provide a rack for attaching electric service wires to a building which rack forms a conduit for enclosing the wires and supports the ends of the open wire service in an elevated position above the wall of the building.

Second, to provide a service rack for buildings which will project above the walls of the buildings and form a support for the ends of electric service wires regardless of the angle at which the wires extend from the building.

Third, to provide a service rack and conduit which forms a tamperproof support and conduit for connecting electric service wires to a meter on the side of a building.

Fourth, to provide a service rack which is easily installed and secured against twisting on a building.

Other objects and advantages relating to details of my rack will be apparent from a consideration of the following description and claims:

The drawings of which there is one sheet illustrate two practical forms of my rack.

Fig. 1 is a side elevational view of my service rack as mounted on the side of a building.

Fig. 2 is a fragmentary front elevational view of the rack partially broken away in vertical section to illustrate details of construction.

Fig. 3 is a fragmentary transverse cross sectional view through the rack shown in Fig. 2 and taken along the plane of the line 3—3 in Fig. 2.

Fig. 4 is a fragmentary front elevational view of a modified form of rack.

In connecting electric service wires from a pole line to a building, electric service companies demand that the wires be attached to the building above certain minimum elevations to provide clearance beneath the wires. Many small buildings do not have walls high enough to meet this minimum requirement, at least at the point closest to the power line or where it is desired to have the wires enter the building. My rack forms an extension which projects above the wall of the building to the necessary height to form a support for the ends of the service wires and forms a conduit for the cable or wires connecting the service wires to the usual meter or terminal box.

In Fig. 1 I have illustrated a building 1 having a meter box 2 and service conduit 3 mounted on the side wall thereof in the usual fashion.

2

My rack, generally indicated at 4, is secured to the side wall of the building and connected to the meter box 2. The rack extends upwardly above the side wall and through the eaves of the roof to form an elevated support for the ends of the electric service wires 5. Lead-in wires or conduit 6 are electrically connected to the service wires and enter the rack 4 through a cap 7. Where the span of the service wires 5 is unusually long and applies an especially high load to the rack 4, a brace 8 may be connected between the roof of the building and the rack. An alternate position of the top of the rack is indicated by the dotted lines in Fig. 1.

More specifically the rack 4 consists of a hollow rectangular metal tube 9 as illustrated in Figs. 2 and 3, the thickness of the walls of the tube being preferably designed to resist the bending strain of the service wires under normal or most common installations. Near the top of the pipe 9 I provide a plurality of tapped apertures 10 which receive the screws 11 for clamping the insulator brackets 12 to the tube. As many holes and brackets as are desired may be provided, the most usual number being three. Insulators 13 are secured in the brackets by a familiar type of pin 14.

The upper end of the tube 9 defines a tapped hole 15 adapted to receive the bolt 16 for securing the rectangular neck 17 on top of the tube. The neck 17 is formed integrally with the base 18 of an otherwise standard type of cap 7.

The lower end of the tube 9 fixedly receives a coupling having a lower end of tubular shape and threaded as at 19 for engagement with the threaded neck 20 of the standard form of meter box 2. Obviously the tube 9 can be turned in the neck 20 until the insulator brackets 12 face in the desired direction relative to the plane of the meter box to almost directly face the incoming service wires 5. The cap 7 will normally overhang the insulator brackets as shown.

In order to mount the rack on the side of the building, I provide a plurality of attaching brackets 21 consisting of a base strip 22 arranged to lie vertically along the wall of the building and be secured thereto by a pair of lag screws or bolts 23. Welded to the base strip 22 is a cross strip 24 defining tapped apertures at each end arranged to receive the bolts 25. A U-shaped clamping ring 26 is positioned around the tube 9 and is provided with apertured ears 27 which are secured to the cross strip by the bolts 25. The contractor installing the rack will preferably locate the brackets and base strips 22 opposite a solid portion of the side wall as at a stud 28 so that the lower end of the pipe is rigidly supported on the building.

Fig. 4 shows a modified form of my rack in which the lower end of the tube 9A is left square and provided with a collar 29 welded thereto. The collar 29 is drilled and tapped to receive the screws 30 passed through the upper wall of a terminal or fuse box 31. Since terminal boxes are normally sealed to prevent unauthorized persons from tampering with the wires therein, the screws 30 preferably extend outwardly from within the box. The modified form of rack is more particularly adapted for higher voltage power services and the tube itself may be made of extra heavy gauge metal.

The insulator bracket 32 is of slightly modified form and consists of a piece of folded metal screwed or welded to the tube and having a forwardly extending double flange 33 thereon. The flange is slotted to receive the yoke 12A. The insulators 13 are pinned individually to their respective yokes 12A.

Obviously the tube 9 can be made in any desirable length and it will be noted that when installed the pipe is closely spaced to the wall of the building so that it is practically impossible for anyone to make an unauthorized opening in the back surface of the tube for the purpose of tapping into the lead-in wires ahead of the meter box. The noncircular cross section of the tube 9 prevents it from turning in the brackets 21 and the rack serves to effectively support the electric service wires. A flanged collar for engagement with the roof of the building may be provided as at 34 in Fig. 1.

Having thus described my invention what I claim as new and desire to secure by Letters Patent is:

1. A service rack for attaching electric service wires to the exterior of a supporting structure and directing the wires along said structure to a wiring receptacle comprising, a hollow metal tube of continuous and integral non-circular cross section, means near the top of one side of said tube for attaching an insulator bracket and insulators to said tube, an entrance cap secured to the top end of said tube, a coupling sealingly and fixedly secured to the bottom of said tube and projecting therefrom for attachment to a receptacle, and means nonrotatably and removably engaging the non-circular portion and the front and sides of said tube and attachable to the supporting structure behind said tube.

2. A service rack for attaching electric service wires to the exterior of a supporting structure and directing the wires along said structure to a wiring receptacle comprising a hollow metal tube of continuous and integral non-circular cross section, means near the top of one side of said tube including holes tapped therein for attaching an insulator bracket and insulators to said tube, an entrance cap secured to the top end of said tube and having a square socket opening in its underside telescopically receiving the end of the tube, a coupling including a cylindrical threaded portion sealingly and fixedly secured to the bottom of said tube and projecting therefrom for attachment to a receptacle, and means including U-shaped clamps having side arms nonrotatably and removably engaging the non-circular portion and the front and sides of said tube and attachable to the supporting structure behind said tube.

EDWARD J. FISHER.

REFERENCES CITED

The following references are of record in the file of this patent:

UNITED STATES PATENTS

| Number | Name | Date |
|---|---|---|
| 590,374 | Osburn | Sept. 21, 1897 |
| 941,156 | Lutz et al. | Nov. 23, 1909 |
| 1,208,884 | Abbott | Dec. 19, 1916 |
| 1,706,237 | Kyle | Mar. 19, 1929 |
| 1,764,071 | Foulke | June 17, 1930 |
| 1,822,879 | Brachtl | Sept. 15, 1931 |
| 1,911,647 | Rah | May 30, 1933 |
| 2,139,742 | Fralick | Dec. 13, 1938 |
| 2,404,152 | Weller | July 16, 1946 |